United States Patent
Nitta (10) Patent No.: US 9,747,022 B2
(45) Date of Patent: Aug. 29, 2017

(54) ELECTRONIC DEVICE (71) Applicant: KYOCERA Document Solutions Inc., Osaka (JP)

(72) Inventor: Ryuichi Nitta, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 299 days.

(21) Appl. No.: 14/486,170

(22) Filed: Sep. 15, 2014

(65) Prior Publication Data
US 2015/0089456 A1 Mar. 26, 2015

(30) Foreign Application Priority Data

Sep. 24, 2013 (JP) ................................. 2013-196797
Mar. 20, 2014 (JP) ................................. 2014-057571

(51) Int. Cl.
*G06F 3/0488* (2013.01)
*G06F 3/041* (2006.01)
*G06F 3/0484* (2013.01)

(52) U.S. Cl.
CPC .......... *G06F 3/0488* (2013.01); *G06F 3/0412* (2013.01); *G06F 3/0484* (2013.01); *G06F 3/04883* (2013.01); *G06F 2203/04104* (2013.01)

(58) Field of Classification Search
CPC .................................................... G06F 3/0488
USPC ............................................................ 715/863
See application file for complete search history.

(56) References Cited

U.S. PATENT DOCUMENTS

| 9,152,317 B2* | 10/2015 | Larco | G06F 3/0482 |
| 2007/0143663 A1* | 6/2007 | Hansen | G06F 17/241 |
| | | | 715/203 |
| 2009/0178008 A1* | 7/2009 | Herz | G06F 3/04817 |
| | | | 715/840 |
| 2009/0265671 A1* | 10/2009 | Sachs | G06F 3/017 |
| | | | 715/863 |
| 2010/0306705 A1* | 12/2010 | Nilsson | G06F 3/0488 |
| | | | 715/835 |
| 2010/0333029 A1* | 12/2010 | Smith | G06F 3/0488 |
| | | | 715/834 |

(Continued)

FOREIGN PATENT DOCUMENTS

| CN | 101727261 | 6/2010 |
| CN | 103246382 | 8/2013 |
| JP | 2012-48525 | 3/2012 |

OTHER PUBLICATIONS

"Graffiti Keyboard Review for Android OS (11/14)", Oct. 4, 2010 (Oct. 4, 2010), XP054975895, Retrieved from the Internet: URL:https://www.youtube.com/watch?v=3Cb07EpBhEY [retrieved on Jun. 4, 2015] * the whole document *.

(Continued)

*Primary Examiner* — Reza Nabi
(74) *Attorney, Agent, or Firm* — Wenderoth, Lind & Ponack, L.L.P.

(57) ABSTRACT

A display control unit executes a first control process if a swipe operation detected by an operation detection unit is a first swipe operation in which a finger is linearly moved, and executes a second control process differing from the first control process if the swipe operation detected by the operation detection unit is a second swipe operation in which the finger is moved along a route differing from the route of the finger in the first swipe operation.

10 Claims, 10 Drawing Sheets

(56) References Cited

U.S. PATENT DOCUMENTS

| | | | | |
|---|---|---|---|---|
| 2012/0226978 A1* | 9/2012 | Harberts | ............... | G06F 3/0482 |
| | | | | 715/702 |
| 2014/0173484 A1* | 6/2014 | Hicks | .................... | G06F 3/0486 |
| | | | | 715/769 |
| 2014/0223345 A1* | 8/2014 | Tetali | .................... | G06F 3/0482 |
| | | | | 715/769 |
| 2014/0281957 A1* | 9/2014 | Weng | .................... | G06F 1/1626 |
| | | | | 715/702 |
| 2015/0015378 A1* | 1/2015 | Aliakseyeu | ............ | G08C 17/00 |
| | | | | 340/12.5 |
| 2015/0074614 A1* | 3/2015 | Walker | ................ | G06F 3/04842 |
| | | | | 715/863 |
| 2015/0193139 A1* | 7/2015 | Kaptelinin | .......... | G06F 3/04883 |
| | | | | 715/863 |
| 2015/0234469 A1* | 8/2015 | Akiyoshi | ................ | G06F 3/011 |
| | | | | 345/156 |
| 2016/0026280 A1* | 1/2016 | Wu | ......................... | G06F 3/041 |
| | | | | 345/173 |
| 2016/0026375 A1* | 1/2016 | Wu | ....................... | G06F 3/0416 |
| | | | | 715/765 |

OTHER PUBLICATIONS

"User Guide Palm Pre Plus—Excerpt", Jan. 1, 2010 (Jan. 1, 2010), pp. 28-31, XP055193740, Retrieved from the Internet: URL:http://www.att.com/support_static_files/manuals/Palm_Pre_Plus.pdf [retrieved on Jun. 4, 2015] * p. 29-30 *.

* cited by examiner

| SECOND SWIPE OPERATION ||  PROCESS CONTENT |
|---|---|---|
| START POSITION | END POSITION | |
| MANUSCRIPT IMAGE REGION | MANUSCRIPT IMAGE REGION | IMAGE INTERCHANGE |
| MANUSCRIPT IMAGE REGION | BACKGROUND REGION | IMAGE DELETION |
| BACKGROUND REGION | MANUSCRIPT IMAGE REGION | BLANK IMAGE INSERTION |
| BACKGROUND REGION | BACKGROUND REGION | NON-ACTION |

ELECTRONIC DEVICE

CROSS-REFERENCE TO RELATED APPLICATION(S)

This application is based upon and claims the benefit of priority from Japanese Patent Application No. 2013-196797 filed on Sep. 24, 2013 and Japanese Patent Application No. 2014-057571 filed on Mar. 20, 2014, the entire contents of which are incorporated herein by reference.

BACKGROUND

In the prior art, there is known an electronic device, such as an image forming apparatus or a portable terminal, which preview-displays a plurality of images on a touch panel. In an image forming apparatus (one example of an electronic device), there is proposed a technique that enables a user to change the order of manuscript images by performing a swipe operation in which a finger is linearly moved while touching a touch panel.

However, if the number of manuscript images is large, it is sometimes the case that all the manuscript images cannot be preview-displayed within a touch panel. In order to enable a user to confirm the respective manuscript images under this circumstance, there is proposed a technique of scrolling images displayed on a touch panel. Specifically, there is proposed a technique in which, if a user linearly swipes his or her finger on a touch panel, images are scrolled in the movement direction of the finger.

SUMMARY

An electronic device according to one aspect of the present disclosure includes a touch panel, an operation detection unit and a display control unit. The touch panel is capable of preview-displaying an image. The operation detection unit is configured to detect a swipe operation in which a finger is moved while touching the touch panel. The display control unit is configured to control the display of the touch panel pursuant to the swipe operation detected by the operation detection unit.

The display control unit is configured to execute a first control process if the swipe operation detected by the operation detection unit is a first swipe operation in which a finger is linearly moved, and to execute a second control process differing from the first control process if the swipe operation detected by the operation detection unit is a second swipe operation in which the finger is moved along a route differing from the route of the finger in the first swipe operation.

DETAILED DESCRIPTION

Embodiments of the present disclosure will now be described in detail with reference to the drawings. The technology of the present disclosure is not limited to the embodiments described herein below.

Embodiment

Figure 1:
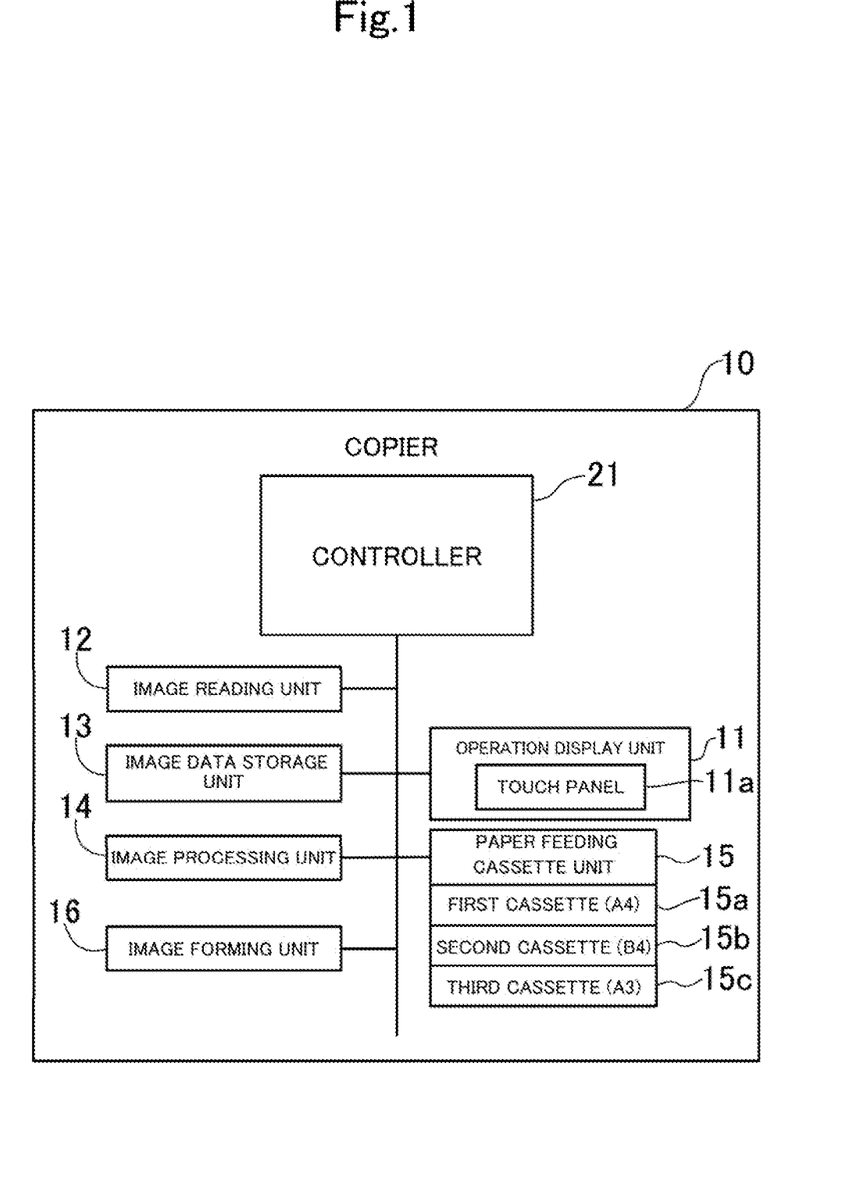
FIG. 1 is a block diagram showing a copier which is one example of an electronic device according to one embodiment.

FIG. 1 is a black diagram showing a copier 10 which is one example of an electronic device according to a first embodiment. The copier 10 includes an operation display unit 11, an image reading unit 12, an image data storage unit 13, an image processing unit 14, a paper feeding cassette unit 15, an image forming unit 16 and a controller 21.

The operation display unit 11 includes a liquid-crystal-type touch panel 11a. The touch panel 11a detects a touch position of a finger on the touch panel 11a and outputs a detection signal to the controller 21. As will be described later, the controller 21 detects a movement route of a user's finger on the touch panel 11a based on the detection signal transmitted from the touch panel 11a.

Responsive to a command transmitted from the controller 21, the image reading unit 12 reads images (manuscript images) of a manuscript paper placed on a platen glass through the use of a line sensor and converts the images to image data. The image reading unit 12 outputs the converted image data to the image data storage unit 13.

The image data storage unit 13 is configured by, e.g., a semiconductor memory or a hard disk. The data of the manuscript image scanned by the image reading unit 12 are stored in the image data storage unit 13. Responsive to a command transmitted from the controller 21, the image data storage unit 13 stores the image data or reads the stored image data to output the image data to the image processing unit 14 or the controller 21.

In response to a command transmitted from the controller 21, the image processing unit 14 performs different kinds of image processing with respect to the image data inputted from the image data storage unit 13 and adjusts (enlarges or reduces) the size of the image data depending on the paper size selected using the touch panel 11a. The image processing unit 14 outputs the size-adjusted image data to the image forming unit 16.

The paper feeding cassette unit 15 includes first to third cassettes 15a to 15c within which papers are accommodated. Recording papers having different sizes are refillably accommodated within the respective cassettes 15a to 15c.

The image forming unit 16 includes a conveyance mechanism for conveying each of the recording papers along a specified conveyance route and a print engine (such as a photosensitive drum, a charger, a developer, a fixing roller and so forth) installed in the conveyance route. Responsive to a command transmitted from the controller 21, the image forming unit 16 supplies the paper from the paper feeding cassette unit 15 to the conveyance route using paper feeding rollers. Then, the image forming unit 16 transfers and fixes an image, which is based on the image data inputted from the image processing unit 14, to the paper. Thereafter, the image forming unit 16 discharges the paper to a discharge tray using discharge rollers.

The controller 21 is formed of a microcomputer that includes a CPU, a ROM, a RAM and so forth. The controller 21 executes a control program stored in the ROM, thereby performing the control of the operation of the copier 10 and the control of the display of the touch panel 11a.

Figure 2:
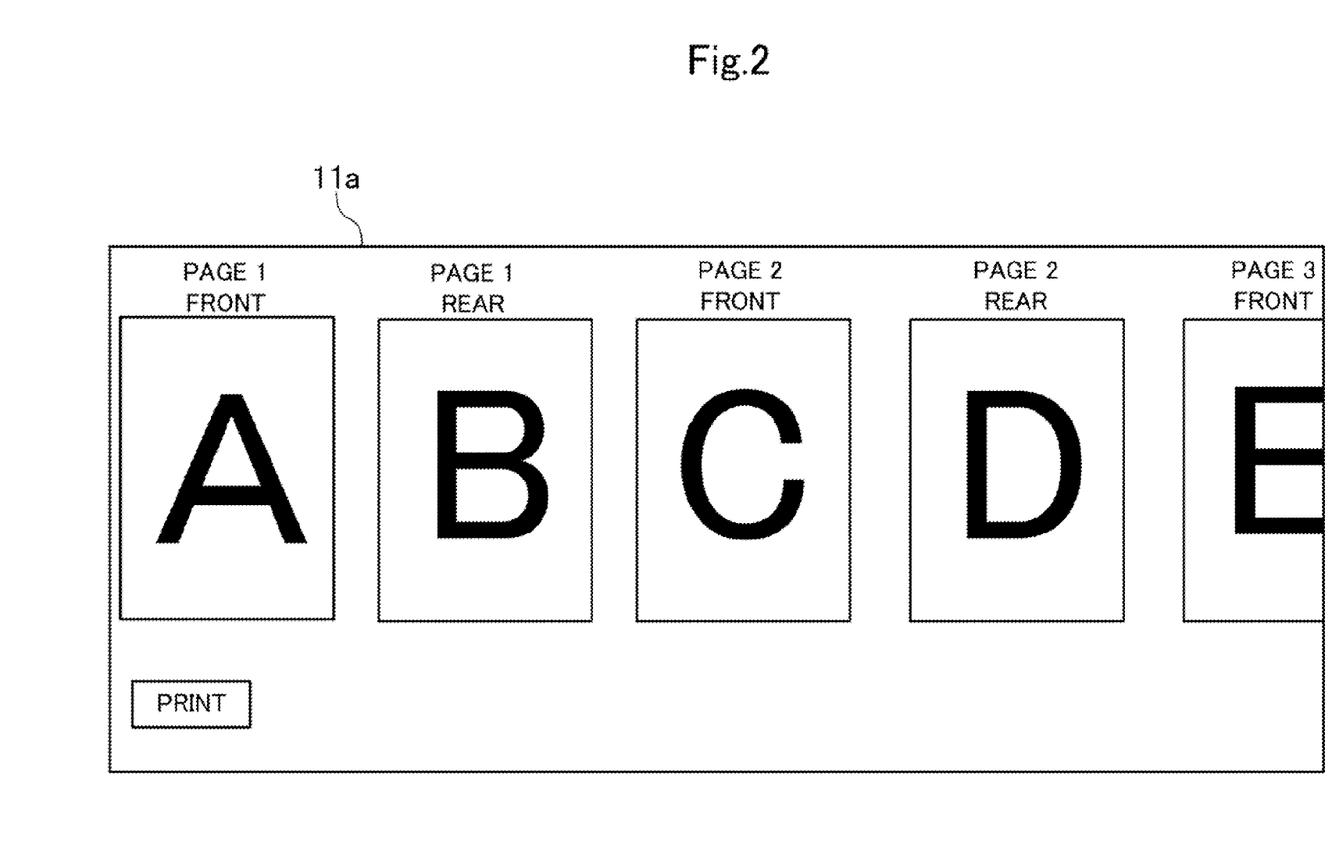
FIG. 2 is a schematic view illustrating manuscript images displayed on a touch panel.

More specifically, the controller 21 reads out a manuscript image, which is read by the image reading unit 12, from the image data storage unit 13 and causes the touch panel 11a to preview-display the manuscript image. If a plurality of manuscript images exists, the controller 21 displays the manuscript images within an extent that fits the touch panel 11a. At this time, the controller 21 assigns page information and front-rear information to the respective manuscript images. Based on the page information and the front-rear information thus assigned, the controller 21 arranges the respective images side by side in a predetermined order (e.g., in a page order or in a front-rear alternating order) (see FIG. 2).

Based on the detection signal transmitted from the touch panel 11a, the controller 21 controls the display of the manuscript images. More specifically, based on the detection signal transmitted from the touch panel 11a, the controller 21 determines whether a user has performed a swipe operation. The term "swipe operation" used herein refers to an operation of moving a finger while keeping the finger in contact with the touch panel 11a. The controller 21 serves as an operation detection unit that detects an operation of moving a finger while keeping the finger in contact with the touch panel 11a. Furthermore, the controller 21 serves as a display control unit that controls the display of the touch panel 11a pursuant to the swipe operation detected by the operation detection unit.

Figure 3:
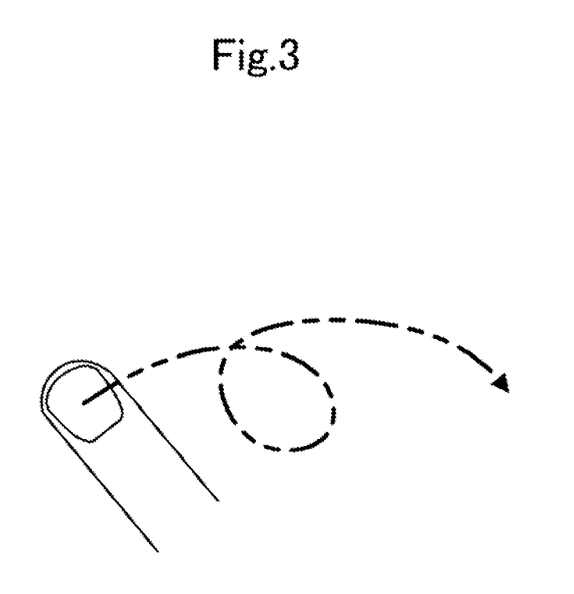
FIG. 3 is a schematic diagram depicting a second swipe operation.

Upon detecting the swipe operation, the controller 21 determines whether the swipe operation corresponds to a first swipe operation or a second swipe operation. The term "first swipe operation" used herein refers to a swipe operation in which the movement route of a finger is linear. The term "second swipe operation" used herein refers to a swipe operation in which, as shown in FIG. 3, a closed loop is formed in the movement route of a finger.

Figure 4:
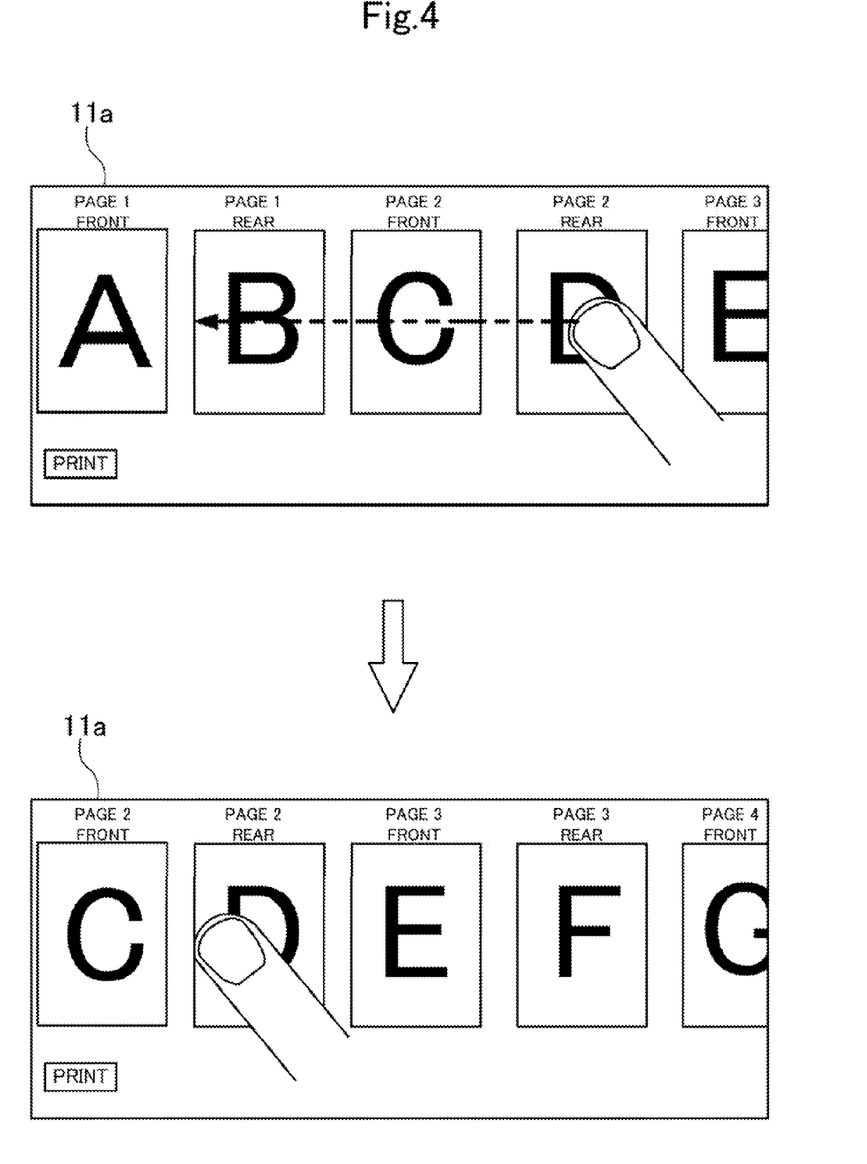
FIG. 4 is a view illustrating a screen scroll process executed by a first swipe operation, in which view the upper row shows a pre-operation state and the lower row shows a post-operation state.

If the first swipe operation is detected, the controller 21 executes a screen scroll process as a first control process. As shown in FIG. 4, in the screen scroll process, a screen is scrolled in the movement direction of a finger.

On the other hand, if the second swipe operation is detected, the controller 21 executes a second control process. The second control process includes an image interchange process, an image deletion process, a blank image insertion process and a non-action process. Depending on the start and end positions of the second swipe operation, the controller 21 executes one of the four processes.

Figure 5:
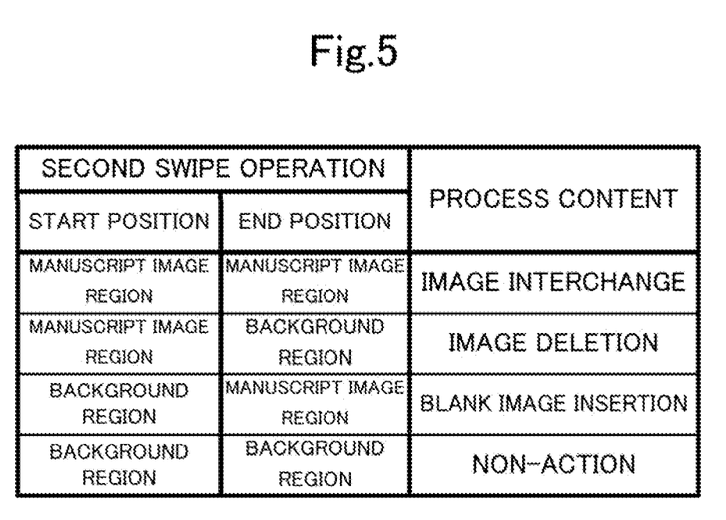
FIG. 5 is a table that summarizes different kinds of processes executed by a second swipe operation.

FIG. 5 is a table that summarizes the relationship between the start and end positions of the second swipe operation and the processes executed by the controller 21.

Figure 6:
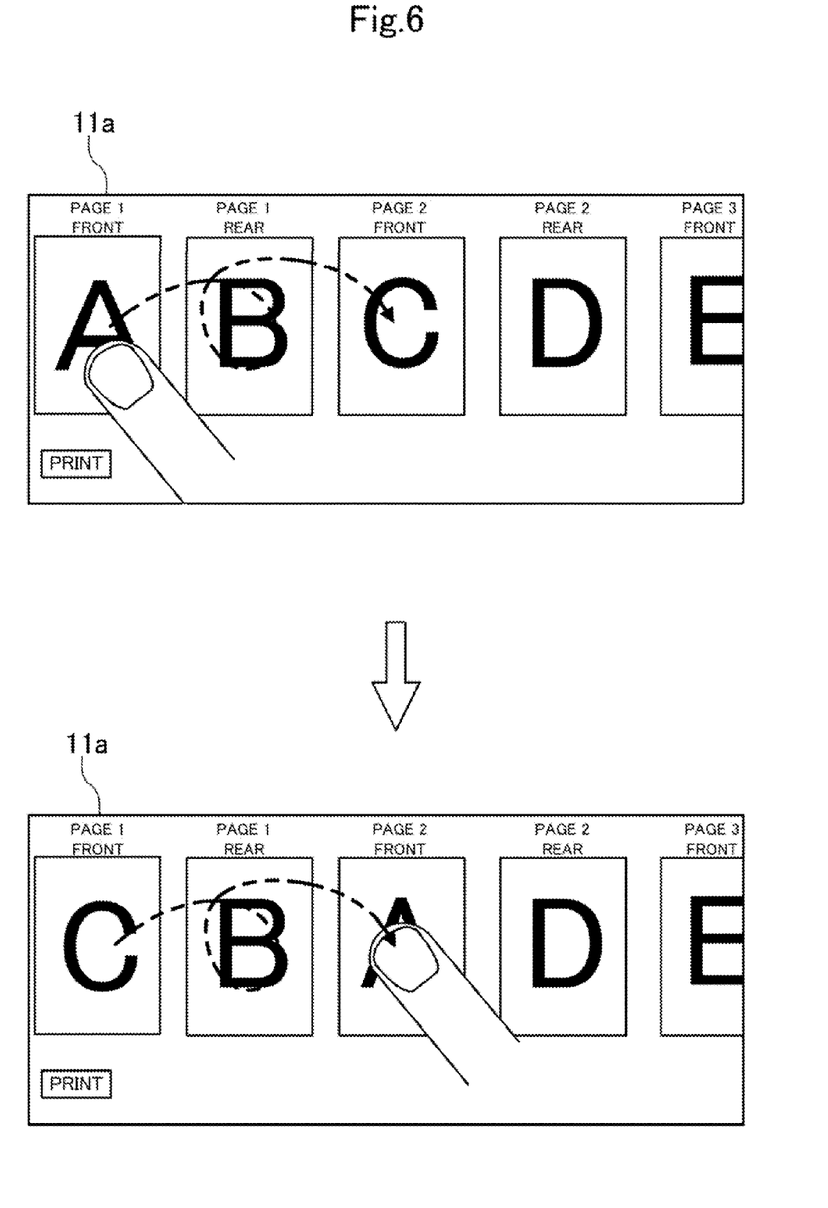
FIG. 6 is a view illustrating an image interchange process executed by a second swipe operation, in which view the upper row shows a pre-operation state and the lower row shows a post-operation state.

As shown in FIG. 5, the controller 21 executes the image interchange process if the start and end positions of the second swipe operation lie in a region of the touch panel 11a where the manuscript images exist (hereinafter referred to as a manuscript image region). As illustrated in FIG. 6, in the image interchange process, the manuscript image existing in the start position of the second swipe operation (the front surface image of page 1 in FIG. 6) is interchanged with the manuscript image existing in the end position of the second swipe operation (the front surface image of page 2 in FIG. 6).

Figure 7:
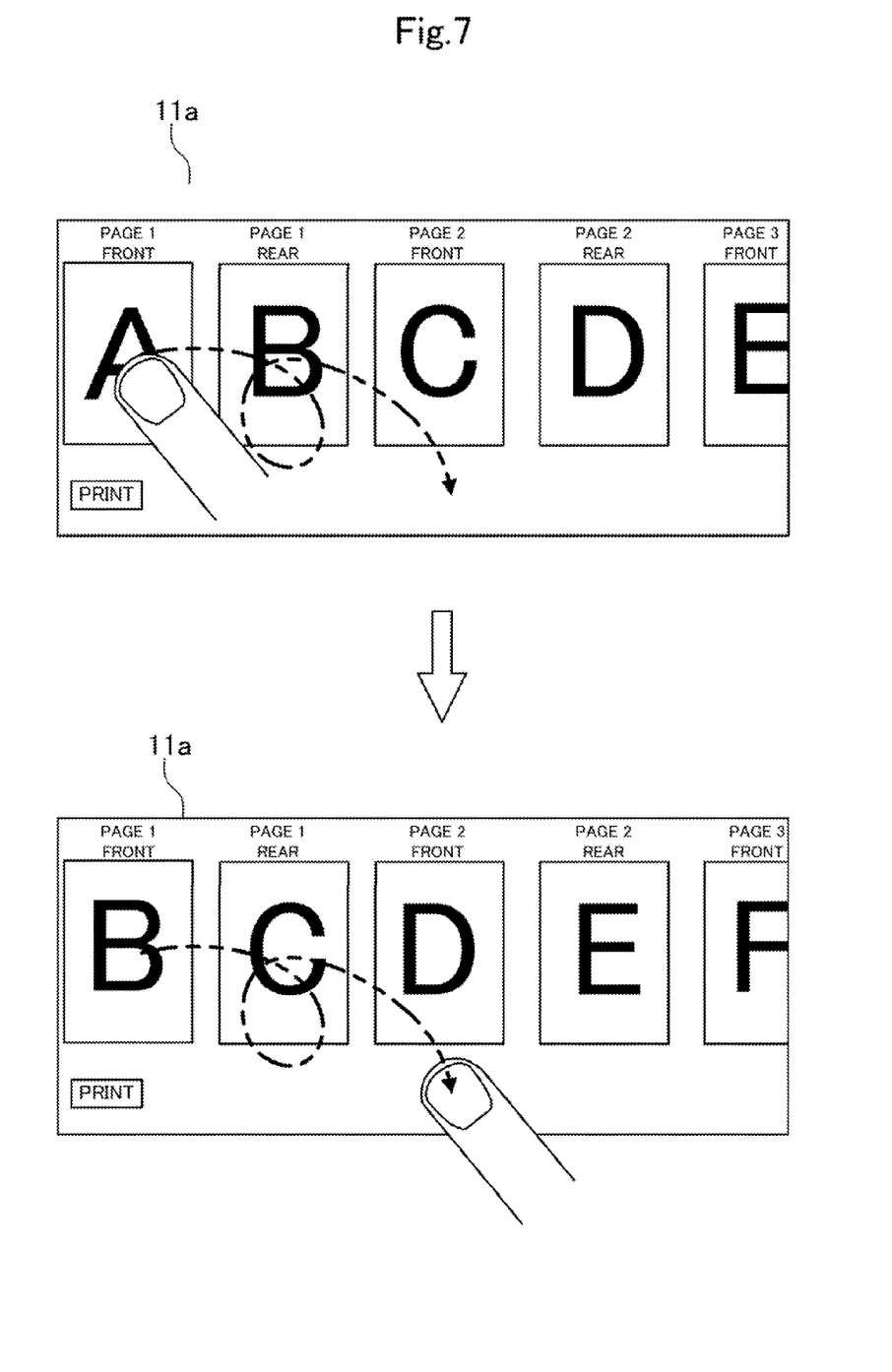
FIG. 7 is a view illustrating an image deletion process executed by a second swipe operation, in which view the upper row shows a pre-operation state and the lower row shows a post-operation state.

The controller 21 executes the image deletion process if the start position of the second swipe operation lies in the manuscript image region and if the end position of the second swipe operation lies in a background region where the manuscript images do not exist. As shown in FIG. 7, in the image deletion process, the manuscript image existing in the start position of the second swipe operation (the front surface image of page 1 in FIG. 7) is deleted and the images positioned after the deleted manuscript image (the rear surface image of page 1 and the subsequent images) are brought forward.

Figure 8:
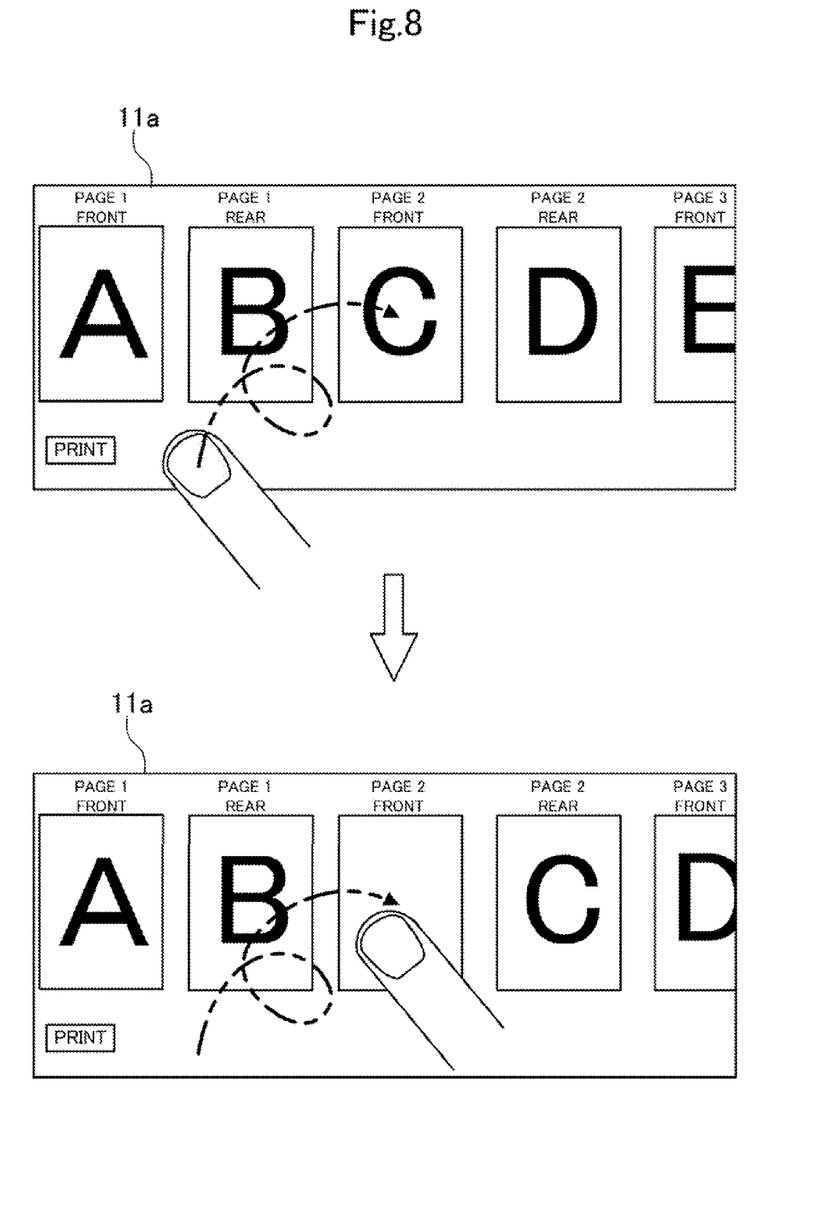
FIG. 8 is a view illustrating a blank image insertion process executed by a second swipe operation, in which view the upper row shows a pre-operation state and the lower row shows a post-operation state.

The controller 21 executes the blank image insertion process if the start position of the second swipe operation lies in the background region and if the end position of the swipe operation lies in the manuscript image region. As shown in FIG. 8, in the blank image insertion process, a blank image is inserted between the manuscript image existing in the end position of the second swipe operation (the front surface image of page 2 in FIG. 8) and the manuscript image positioned just before the manuscript image existing in the end position of the second swipe operation (the rear surface image of page 1 in FIG. 8).

Figure 9:
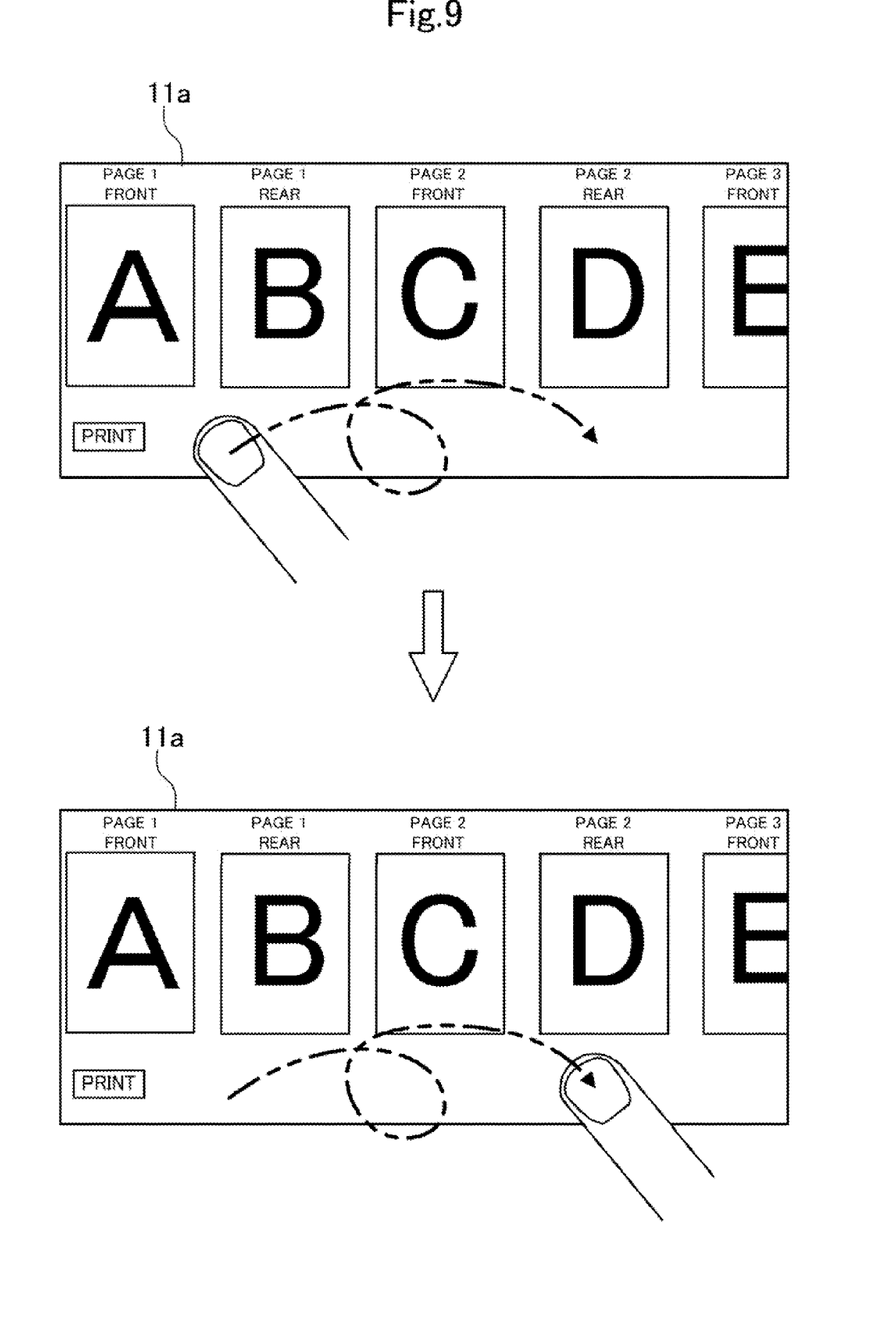
FIG. 9 is a view illustrating a non-action process executed by a second swipe operation, in which view the upper row shows a pre-operation state and the lower row shows a post-operation state.

The controller 21 executes a non-action process if the start and end positions of the second swipe operation lie in the background region. As shown in FIG. 9, the non-action process is a process in which nothing is performed with respect to the manuscript images displayed on the touch panel 11a.

As described above, the controller 21 is configured to execute the screen scroll process as the first control process if the first swipe operation (linear swipe operation) is detected, and to execute the second control process if the second swipe operation (a swipe operation including a loop route) is detected.

Thus, a user can perform different control processes with respect to the preview-displayed manuscript images by properly using the linear first swipe operation and the second swipe operation including a loop route. Therefore, as compared with a case where different control processes are performed with respect to manuscript images depending on a touch speed or a touch time in a linear swipe operation, it is possible to differently execute the respective control processes without resort to the sense of the user. This makes it possible to reliably keep the user from making an erroneous operation.

Moreover, the second swipe operation is an operation in which a closed loop is formed in the movement route of the finger. Thus, the user can perform the second swipe operation through the natural movement of the finger.

In the embodiment described above, the controller 21 is configured to differently perform a plurality of different processes (the image interchange process, the image deletion process, the blank image insertion process and the non-action process) depending on the start position and the end position of the swipe operation.

Accordingly, even if execution buttons for the execution of the respective processes are not installed in the touch panel 11a, the user can easily distinguish and perform the respective processes by merely changing the start position and the end position of the swipe operation.

Other Embodiments

In the aforementioned embodiment, the first control process is a screen scroll process. However, the present disclosure is not limited thereto. For example, the first control process may be a non-action process. In this case, even if the first swipe operation (linear swipe operation) is detected, the controller 21 does nothing with respect to the manuscript images. Only when the second swipe operation including a loop route is defected, the controller 21 executes different kinds of processes with respect to the manuscript images. Therefore, in case where a user erroneously touches the touch panel 11a, it is possible to prevent different kinds of processes from being executed with respect to the manuscript images against the user's intention. Thus, it becomes possible to prevent a user's erroneous operation. In this case, it goes without saying that the second control process is not a non-action process.

Figure 10:
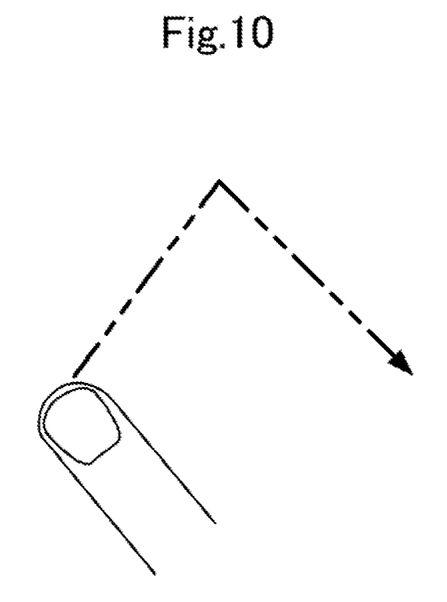
FIG. 10 is a schematic diagram showing one example of a second swipe operation according to another embodiment.
Figure 11:
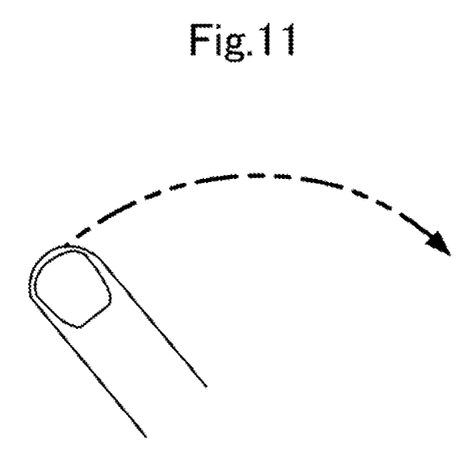
FIG. 11 is a schematic diagram showing one example of a second swipe operation according to a further embodiment.

In the aforementioned embodiment, the second swipe operation is an operation in which a loop route is included in the movement route of the finger. However, the present disclosure is not limited thereto. For example, the second swipe operation may be an operation in which the finger is moved in a V-like fashion as shown in FIG. 10 or an operation in which the finger is moved in an arc-like fashion as shown in FIG. 11. That is to say, the second swipe operation may be any operation as long as the finger is moved along a route differing from the route of the finger in the first swipe operation in which the finger is linearly moved.

In the aforementioned embodiment, the copier 10 has been described as one example of the electronic device. However, the electronic device is not limited thereto but may be, e.g., a printer, a scanner, a multifunction peripheral or a portable terminal.

In the aforementioned embodiment, the images displayed on the touch panel 11a of the electronic device are the manuscript images read by the image reading unit 12. However, the images displayed on the touch panel 11a are not limited thereto but may be the images downloaded through the Internet or the images received from an external terminal.

As described above, the technology of the present disclosure is useful in an electronic device including a touch panel, particularly in an electronic device capable of preview-displaying an image on a touch panel.

What is claimed is:

1. An electronic device comprising:
   a touch panel capable of displaying an image;
   an operation detection unit configured to detect a swipe operation in which a finger is moved while touching the touch panel; and
   a display control unit configured to control a display of the touch panel pursuant to the swipe operation detected by the operation detection unit,
   wherein the display control unit is configured to execute a first control process when the swipe operation detected by the operation detection unit is a first swipe operation in which a finger is linearly moved, and to execute a second control process differing from the first control process when the swipe operation detected by the operation detection unit is a second swipe operation in which the finger is moved along a route differing from a route of the finger in the first swipe operation,
   wherein the second control process includes a plurality of different processes,
   wherein the display control unit is configured to, when the swipe operation detected by the operation detection unit is the second swipe operation, execute one of the plurality of different processes included in the second control process depending on a start position and an end position of the second swipe operation,
   wherein the image includes a plurality of images,
   wherein the display control unit is configured to display the plurality of images side by side in a predetermined order, and
   wherein the plurality of different processes of the second control process includes at least three of:
      an image interchange process in which an image existing in the start position of the second swipe operation is interchanged with an image existing in the end position of the second swipe operation;
      an image deletion process in which, when the end position of the second swipe operation lies in a background region where no image exists, an image existing in the start position of the second swipe operation is deleted;
      a blank image insertion process in which, when the start position of the second swipe operation lies in the background region where no image exists, a blank image is inserted between the image existing in the end position of the second swipe operation and an image positioned just before the image existing in the end position of the second swipe operation; and
      a non-action process in which, when the start position and the end position of the second swipe operation lie in the background region where no image exists, nothing is performed with respect to the plurality of images.

2. The device of claim 1, wherein the second swipe operation is an operation in which a closed loop is formed in a movement route of the finger.

3. The device of claim 1, wherein the first control process is a non-action process in which nothing is performed with respect to the image.

4. The device of claim 1, wherein the second control process includes all of the image interchange process, the image deletion process, the blank image insertion process and the non-action process.

5. The device of claim 1, wherein the first control process is a scroll process in which a screen is scrolled in a movement direction of a finger.

6. An electronic device comprising:
   a image reading unit configured to read an image of a manuscript paper,
   a touch panel capable of preview-displaying a manuscript image read by the image reading unit;
   an operation detection unit configured to detect a swipe operation in which a finger is moved while touching the touch panel; and
   a display control unit configured to control a display of the touch panel pursuant to the swipe operation detected by the operation detection unit, wherein the display control unit is configured to execute a first control process when the swipe operation detected by the operation detection unit is a first swipe operation in which a finger is linearly moved, and to execute a second control process differing from the first control process when the swipe operation detected by the operation detection unit is a second swipe operation in which the finger is moved along a route differing from a route of the finger in the first swipe operation, wherein the second control process includes a plurality of different processes, wherein the display control unit is configured to, when the swipe operation detected by the operation detection unit is the second swipe operation, execute one of the plurality of different processes included in the second control process depending on a start position and an end position of the second swipe operation, wherein the manuscript image includes a plurality of images, wherein the display control unit is configured to display the plurality of manuscript images in a page order and in a front-rear alternating order, and wherein the plurality of different processes of the second control process include at least three of:

an image interchange process in which a manuscript image existing in the start position of the second swipe operation is interchanged with a manuscript image existing in the end position of the second swipe operation;

an image deletion process in which, when the end position of the second swipe operation lies in a background region where no manuscript image exists, a manuscript image existing in the start position of the second swipe operation is deleted, and manuscript images positioned after the deleted manuscript image are brought forward;

a blank image insertion process in which, when the start position of the second swipe operation lies in the background region where no manuscript image exists, a blank image is inserted between the manuscript image existing in the end position of the second swipe operation and a manuscript image positioned just before the manuscript image existing in the end position of the second swipe operation; and a non-action process in which, when the start position and the end position of the second swipe operation lie in the background region where no manuscript image exists, nothing is performed with respect to the plurality of manuscript images.

7. The device of claim 6, wherein the second swipe operation is an operation in which a closed loop is formed in a movement route of the finger.

8. The device of claim 6, wherein the first control process is a non-action process in which nothing is performed with respect to the image.

9. The device of claim 6, wherein the second control process includes all of the image interchange process, the image deletion process, the blank image insertion process and the non-action process.

10. The device of claim 6, wherein the first control process is a scroll process in which a screen is scrolled in a movement direction of a finger.

* * * * *